(12) United States Patent
Terada et al.

(10) Patent No.: US 8,720,735 B2
(45) Date of Patent: May 13, 2014

(54) PRESSURE VESSEL

(75) Inventors: Susumu Terada, Takasago (JP); Tatsuo Nishihara, Takasago (JP); Yukihiro Fukada, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 268 days.

(21) Appl. No.: 13/252,359

(22) Filed: Oct. 4, 2011

(65) Prior Publication Data

US 2012/0091152 A1 Apr. 19, 2012

(30) Foreign Application Priority Data

Oct. 15, 2010 (JP) ................................ 2010-232222

(51) Int. Cl.
*F17C 5/00* (2006.01)
*F17C 13/04* (2006.01)

(52) U.S. Cl.
USPC .......... 220/581; 220/4.12; 220/582; 220/661; 220/626; 220/669; 60/267; 60/752; 122/511; 122/362; 122/365; 122/195; 376/204; 376/205; 376/294; 138/178; 138/177

(58) Field of Classification Search
USPC ............. 228/184; 60/267, 752; 376/204, 205, 376/294; 220/581, 582, 586, 626, 4.12, 220/661, 669, 674; 285/150, 189; 122/511, 122/362, 365, 201; 138/178, 177, 42
See application file for complete search history.

(56) References Cited

U.S. PATENT DOCUMENTS

| | | | | |
|---|---|---|---|---|
| 513,620 A * | 1/1894 | Philips | ........................ | 122/512 |
| 713,537 A * | 11/1902 | Treadwell | ..................... | 403/282 |
| 1,120,071 A * | 12/1914 | MacDonald | .................. | 122/365 |
| 1,313,542 A * | 8/1919 | Jones | ........................ | 285/288.1 |
| 1,629,208 A * | 5/1927 | Ernst | ................................ | 138/37 |
| 1,889,874 A * | 12/1932 | Obert | ............................ | 285/189 |
| 1,911,654 A * | 5/1933 | Taylor | ........................... | 285/189 |
| 1,966,403 A * | 7/1934 | Durham | ..................... | 285/141.1 |
| 1,984,242 A * | 12/1934 | Trainer et al. | .............. | 285/131.1 |
| 2,216,033 A * | 9/1940 | Hopkins | ....................... | 228/189 |
| 2,271,652 A * | 2/1942 | Langvand et al. | ........... | 122/365 |
| 2,425,470 A * | 8/1947 | Hart | ............................. | 285/189 |
| 2,455,311 A * | 11/1948 | Meyers et al. | ............... | 285/220 |
| 2,479,578 A * | 8/1949 | Langvand | .................. | 285/132.1 |
| 2,507,752 A * | 5/1950 | Benson | ........................ | 220/661 |
| 2,533,720 A * | 12/1950 | Danel | ........................ | 285/132.1 |
| 2,981,556 A * | 4/1961 | Jackson | ......................... | 285/22 |
| 3,116,756 A * | 1/1964 | Alderson | ...................... | 137/875 |
| 3,171,790 A * | 3/1965 | Challender et al. | .......... | 376/361 |
| 3,238,605 A * | 3/1966 | Hills | .......................... | 29/890.15 |

(Continued)

FOREIGN PATENT DOCUMENTS

JP 6-49898 U 7/1994

*Primary Examiner* — Mickey Yu
*Assistant Examiner* — Gideon Weinerth
(74) *Attorney, Agent, or Firm* — Oblon, Spivak, McClelland, Maier & Neustadt, L.L.P.

(57) ABSTRACT

A pressure vessel, including: a body portion; and an inclined nozzle projecting from the body portion along an axis inclined relative to an inner surface of the body portion, wherein: a through hole of a circular section is formed through both the body portion and the inclined nozzle. At an intersecting portion between the inner surface of the body portion and a surface surrounding the through hole, there are formed round portions. The radius of each of the round portions at two positions in a major axis direction is smaller than the radius of each of round portions.

3 Claims, 5 Drawing Sheets

(56) References Cited

U.S. PATENT DOCUMENTS

| | | | |
|---|---|---|---|
| 3,274,671 A * | 9/1966 | Hauer et al. | 29/890.14 |
| 3,280,567 A * | 10/1966 | Elliott et al. | 60/263 |
| 3,298,560 A * | 1/1967 | Anderson | 220/567.1 |
| 3,775,251 A * | 11/1973 | Schabert | 376/294 |
| 3,785,924 A * | 1/1974 | Notari | 376/287 |
| 3,934,787 A * | 1/1976 | Fels | 228/184 |
| 4,168,071 A * | 9/1979 | Jacobson et al. | 277/606 |
| 4,190,101 A * | 2/1980 | Hartmann | 165/82 |
| 4,438,955 A * | 3/1984 | Ryan | 285/189 |
| 4,463,868 A * | 8/1984 | Murase | 220/288 |
| 4,639,992 A * | 2/1987 | Stol et al. | 29/890.051 |
| 5,104,155 A * | 4/1992 | Kirkwood | 285/125.1 |
| 5,133,475 A * | 7/1992 | Sharp | 220/589 |
| 6,024,243 A * | 2/2000 | Palazzo | 220/586 |
| 6,026,804 A * | 2/2000 | Schardt et al. | 126/344 |
| 6,736,134 B2 * | 5/2004 | Marko | 126/680 |
| 6,888,908 B1 * | 5/2005 | Klarner et al. | 376/205 |
| 7,000,571 B2 * | 2/2006 | Doule et al. | 122/32 |
| 7,052,048 B2 * | 5/2006 | Murphy | 285/139.1 |
| 7,278,661 B2 * | 10/2007 | Usui | 285/189 |
| 7,533,633 B2 * | 5/2009 | Becker et al. | 122/511 |
| 8,348,090 B2 * | 1/2013 | Crager et al. | 220/661 |
| 2005/0220249 A1 * | 10/2005 | Bon et al. | 376/203 |
| 2008/0001394 A1 * | 1/2008 | Ziu | 285/21.2 |
| 2011/0194663 A1 * | 8/2011 | Hori et al. | 376/204 |
| 2012/0073692 A1 * | 3/2012 | McGriff et al. | 138/98 |
| 2013/0026172 A1 * | 1/2013 | Asakawa et al. | 220/669 |
| 2013/0134705 A1 * | 5/2013 | Ficker et al. | 285/201 |

\* cited by examiner

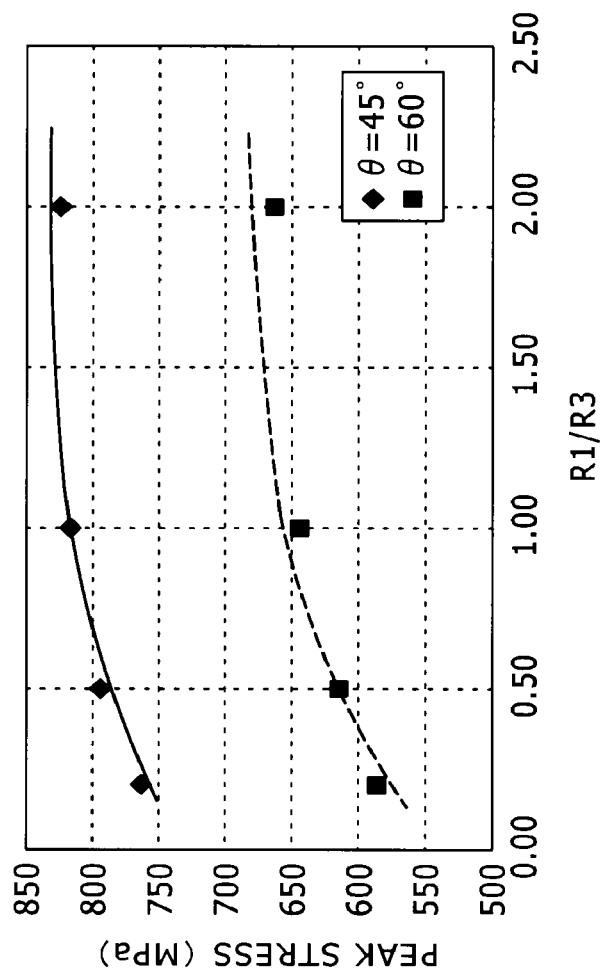

PRESSURE VESSEL

BACKGROUND OF THE INVENTION

1. Field of the Invention

The present invention relates to a pressure vessel for use under a high pressure condition.

2. Description of the Related Art

Pressure vessels designed to withstand high operating pressures have heretofore been known such as, for example, pressure vessels for petrochemical plants and nuclear reactor pressure vessels.

A pressure vessel described in Japanese Utility Model Laid Open No. Hei 6 (1994)-49898 has a vessel body and a nozzle projecting from the vessel body in a direction perpendicular to an inner surface of the vessel body. The pressure vessel described therein is provided with a through hole of a circular section extending through both the pressure vessel and nozzle in a direction perpendicular to the inner surface of the vessel body.

There also is known a pressure vessel having an inclined nozzle projecting from a vessel body in a direction inclined relative to an inner surface of the vessel body. The inclined nozzle indicates a nozzle extended in a direction not perpendicular to the inner surface of the vessel body. The pressure vessel in question is provided with a through hole of a circular section extending through both the vessel body and nozzle in a direction inclined relative to the inner surface of the vessel body (in the projecting direction of the inclined nozzle from the vessel body).

A peak stress induced in the pressure vessel under a predetermined pressure condition is larger in the pressure vessel having the inclined nozzle than in the pressure vessel described in the above utility model publication which has a nozzle perpendicular to the inner surface of the vessel body. More particularly, in the pressure vessel having the inclined nozzle, since the through hole is formed inclinedly, an extremely thin wall portion (an acute-angled portion) of the vessel body is formed partially in the circumferential direction at the portion where the surface surrounding the through hole and the inner surface of the vessel body intersect with each other, and stress is concentrated on the extremely thin wall portion. Consequently, the peak stress in case of providing the inclined nozzle becomes larger than in the pressure vessel having a nozzle perpendicularly to the inner surface of the vessel body.

In the conventional pressure vessel having the inclined nozzle, the wall thickness of the vessel body is made large or the inclined nozzle is strongly reinforced to diminish the peak stress induced in the pressure vessel.

However, making the wall thickness of the vessel body large or strongly reinforcing the inclined nozzle results in increase of the amount of the material which constitutes the pressure vessel, thus leading to a marked increase of the cost.

SUMMARY OF THE INVENTION

It is an object of the present invention to diminish the peak stress without a marked increase of the cost of a pressure vessel having an inclined nozzle.

According to the present invention, for solving the above-mentioned problems, there is provided a pressure vessel comprising: a vessel body; and an inclined nozzle projecting from the vessel body along an axis inclined relative to an inner surface of the vessel body, wherein: a through hole of a circular section is formed through both the vessel body and the inclined nozzle along the inclined axis; at an intersecting portion between the inner surface of the vessel body and a surface surrounding the through hole, there are formed round portions throughout the whole circumference; and in an inner opening of the through hole appearing in a generally elliptic shape when the inner surface of the vessel body is seen in a direction orthogonal thereto, the radius of each of round portions formed at two positions in a major axis direction is smaller than the radius of each of round portions formed at two positions in a minor axis direction, and the round portions formed throughout the whole circumference continuously increase in radius from the round portions positioned in the major axis direction to the round portions positioned in the minor axis direction in the circumferential direction of the inner opening.

According to the present invention, since the radius of the round portion at the major elliptical axes (hereinafter referred to as the radius of each of the round portions positioned in the major axis direction), is smaller than the radius of the round portion at the minor elliptical axes (hereinafter referred to as the radius of each of the round portions positioned in the minor axis direction), and since the round portions formed throughout the whole circumference continuously increase in radius from positions in the major axis direction to positions in the minor axis direction, the shape of the inner opening of the through hole can be made close to a circular shape from the generally elliptic shape when the inner surface of the vessel body is seen in a direction orthogonal to the inner surface. Thus, according to the present invention it is possible to diminish the peak stress without causing a marked increase of cost, for the following reason.

It is generally known that when a force (tensile force) is applied to a flat plate formed with an elliptic hole, the force acting along the surface of the flat plate, a stress induced on the flat plate concentrates on two positions in the major axis direction of the elliptic shape. If the shape of the hole is made closer to a circular shape from the elliptic shape, the stress induced on the flat plate is diffused in the minor axis direction of the elliptic shape, so that the peak stress becomes smaller. In the present invention, by adjusting the round portions with respect to radius, the shape of the inner opening of the through hole can be made closer to a circular shape from the generally elliptic shape, so that the stress concentrated on positions in the major axis direction can be dispersed in the minor axis direction.

In connection with this construction, when reference is made to the "inclined axis relative to the inner surface of the vessel body," it is intended to exclude an axis perpendicular to the inner surface of the vessel body. In the case where "the inner surface of the vessel body" is a curved surface, the "inclined axis" indicates an axis inclined relative to a surface which contacts a specific point on the curved surface and passing through the specific point.

In the above pressure vessel it is preferable that in the range between one of the round portions formed at two positions in the major axis direction and each of the round portions formed at two positions in the minor axis direction, the radius of the round portions located in the range increase in proportion to the magnitude of an around-the-center angle of a line segment joining the round portion other than the one round portion and the center of the generally elliptic shape relative to a line segment joining the center of the generally elliptic shape and the one round portion.

In the above pressure vessel, the round portions are increased in radius in proportion to the around-the-center angle relative to a line segment joining the center of the generally elliptic shape and a round portion positioned in the major axis direction. Therefore, the machining for forming round portions becomes easier in comparison with the case where the rate of increase in radius is increased or decreased in accordance with the above angle.

In the above pressure vessel it is preferable that out of the radii of the round portions formed at two positions in the major axis direction of the inner opening, the radius of the round portion formed at a portion where the inner surface of the vessel body and the surface surrounding the through hole intersect with each other at an acute angle be smaller than the radius of the other round portion.

According to the above pressure vessel, the peak stress in use of the pressure vessel can be diminished while ensuring safety. More particularly, in the pressure vessel in question, a round portion is formed at the portion of intersection between the inner surface of the vessel body and the through hole-surrounding surface in order to suppress the occurrence of a worker's injury caused by contacting the intersecting portion. However, by merely enlarging the radii of the round portions from the standpoint of ensuring safety, the shape of the inner opening of the through hole approaches an elliptic shape with increase of the peak stress. In this connection, in the above pressure vessel, paying attention to the point that at a portion where the inner surface of the vessel body and the through hole-surrounding surface intersect with each other at an acute angle, a large curved surface can be obtained even in a small radius, the radius of the round portion formed at the portion where the inner surface of the vessel body and the through hole-surrounding surface intersect with each other at an acute angle is set smaller than the radius of the other round portion. According to the above pressure vessel, therefore, it is possible to diminish the peak stress while ensuring safety.

According to the present invention it is possible to diminish the peak stress without causing a marked increase of cost.

BRIEF DESCRIPTION OF THE DRAWINGS

FIG. 5 is a graph showing a relation between the ratio of a radius of a round portion formed in a major axis direction to that of a round portion formed in a minor axis direction and a peak stress.

DETAILED DESCRIPTION OF A PREFERRED EMBODIMENT

A preferred embodiment of the present invention will be described below with reference to the drawings.

Figure 1:
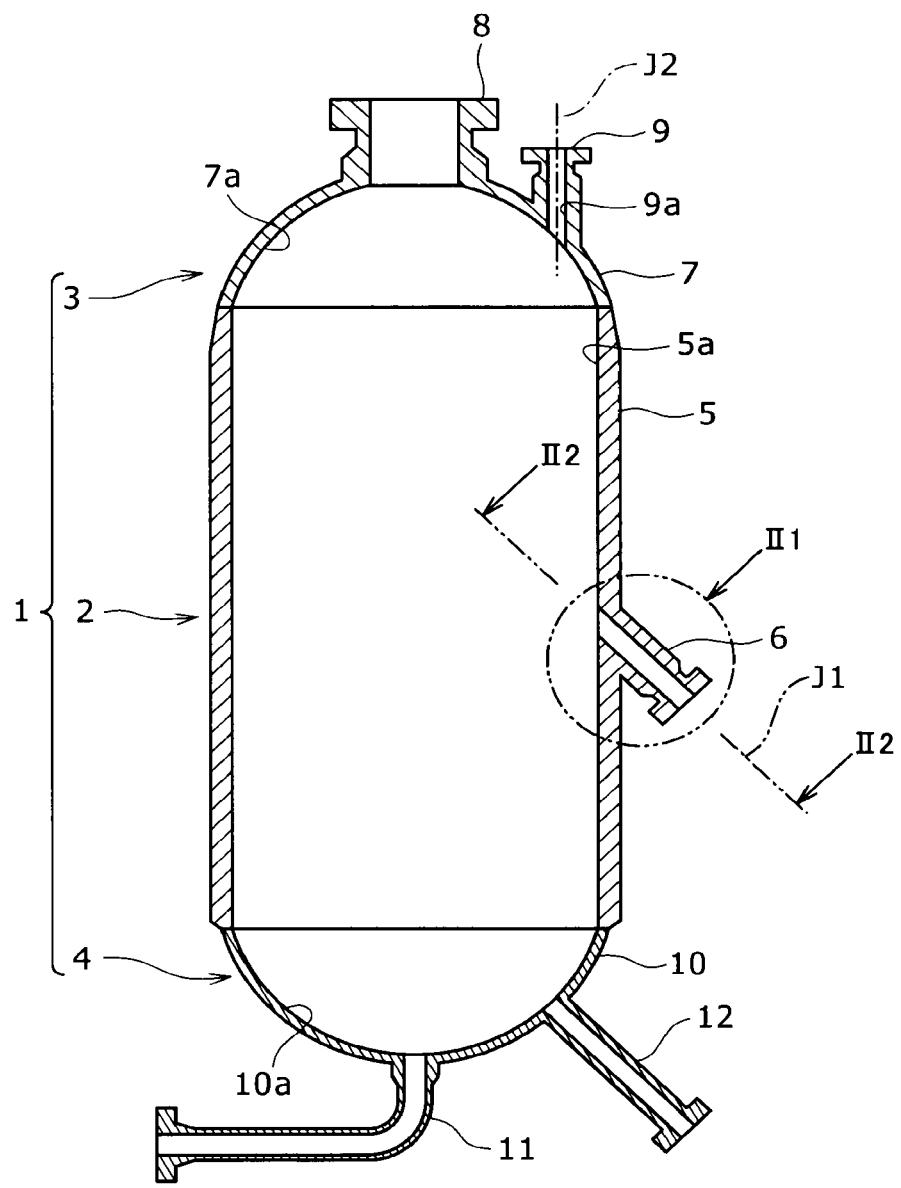
FIG. 1 is a sectional front view showing an entire construction of a pressure vessel according to an embodiment of the present invention.
Figure 2:
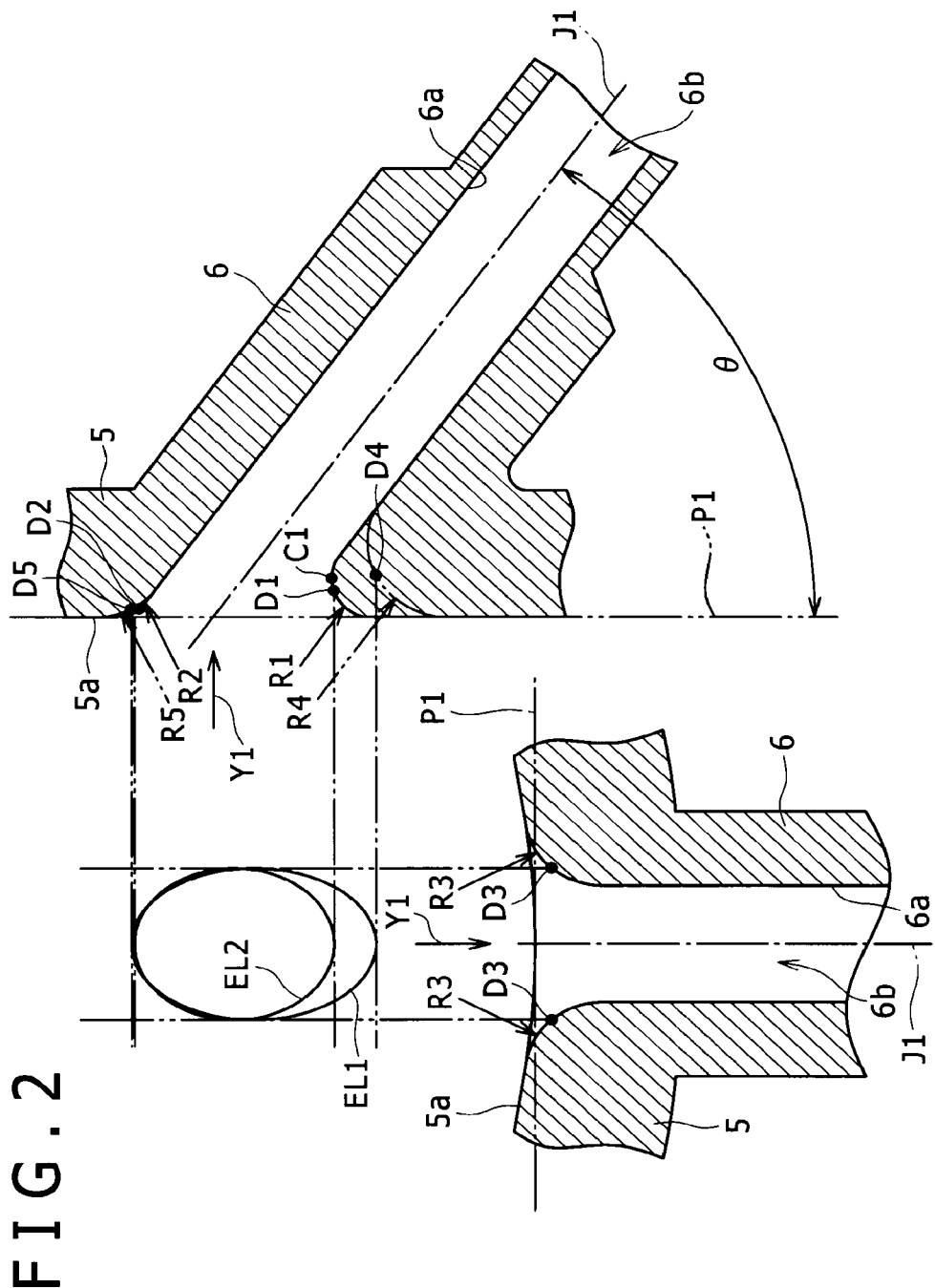
FIG. 2 is a schematic diagram showing both an enlarged view of II 1 portion in FIG. 1 and a sectional view taken on line II 2-II 2 in FIG. 1 side by side.

FIG. 1 is a sectional front view showing an entire construction of a pressure vessel according to an embodiment of the present invention. FIG. 2 is a schematic diagram showing both an enlarged view of II 1 portion in FIG. 1 and a sectional view taken on line II 2-II 2 in FIG. 1 side by side.

Referring to FIGS. 1 and 2, a pressure vessel 1 is a vessel made of, for example, 2.25Cr-1Mo-0.25V steel and which is used under the condition of an operating pressure (e.g., 16.7 MPa). More specifically, the pressure vessel 1 includes a cylindrical shell portion 2, a first end portion 3 provided at one end of the shell portion 2, and a second end portion 4 provided at an opposite end of the shell portion 2.

The shell portion 2 includes a cylindrical body portion (a part of the vessel body) 5 and an inclined nozzle 6 projecting from the body portion 5. The inclined nozzle 6 projects from the body portion 5 along an inclined axis J1 which is inclined downwards at an angle of θ relative to an inner surface 5a of the body portion 5. More specifically, the inclined axis J1 is inclined downwards at an angle of θ relative to an imaginary surface P1 (see FIG. 2) which is in linear contact with the inner surface 5a as a cylindrical surface, and intersects a line of contact between the imaginary surface P1 and the inner surface 5a. Moreover, a through hole 6b of a circular section is formed through both the body portion 5 and the inclined nozzle 6 along the inclined axis J1.

At an intersecting portion between the inner surface 5a of the body portion 5 and a surface 6a which surrounds the through hole 6b, round portions are formed throughout the whole circumference. More specifically, for an inner opening of the through hole 6b, which appears as a generally elliptic shape when the inner surface 5a of the body portion 5 is seen in a direction orthogonal thereto, (see a generally elliptic shape EL2 in FIG. 2), the radius R1 or R2 of each of round portions formed at two positions in a major axis direction is smaller than the radii R3, R3 of each of round portions formed at two positions in a minor axis direction. Further, the round portions increase in radius continuously from the radius R1 to the radii R3, R3 and also from the radius R2 to the radii R3, R3.

Figure 4:
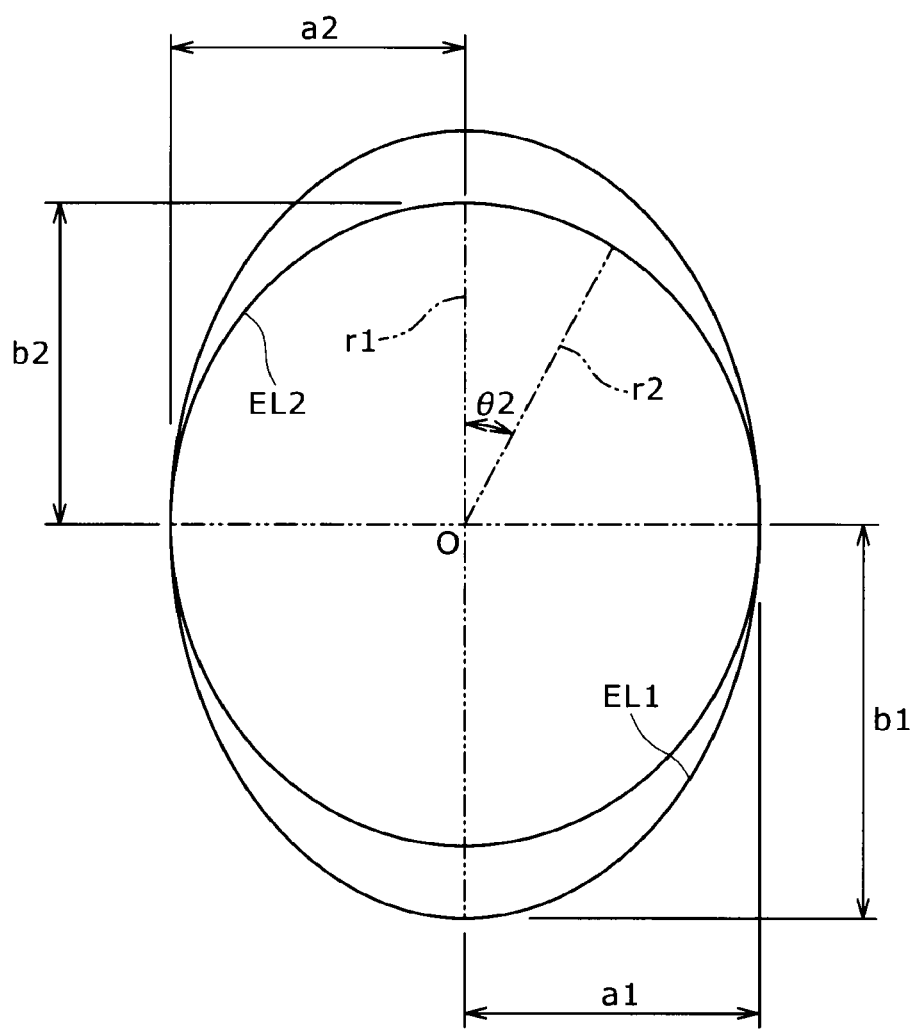
FIG. 4 is an explanatory diagram showing generally elliptic shapes EL1 and EL2 in FIG. 2 arranged concentrically.

More specifically, in the range between the round portion of radius R2 in the major axis direction and each of the round portions of radii R3, R3 in the minor axis direction, the round portions increase in radius in the following manner. In FIG. 4, a line segment r1 joining a center O of the generally elliptic shape EL2 of the inner opening of the through hole 6b and the round portion of radius R2 in the major axis direction is a reference line segment. The radius of a round portion other than the round portion of radius R2, the round portion in question being connected to the center O through a specific line segment r2, increases in proportion to the magnitude of an angle θ between the reference line segment r1 and the specific line segment r2. Also in the range between the round portion of radius R1 in the major axis direction and each of the round portions of radii R3, R3 in the minor axis direction, the radii of round portions increase in the same manner as above. Thus, in this embodiment, since the round portions increase in radius in proportion to the magnitude of the angle θ relative to the reference line segment r1, the machining for forming the round portions becomes easier than in case of increasing or decreasing the increase rate of radius in accordance with the angle θ.

In the pressure vessel 1 of this embodiment, as described above, the radii R1 and R2 are each smaller than each of the radii R3, R3 and the round portions increase in radius continuously from R1, R2 to the radii R3, R3. Therefore, in the pressure vessel 1, the shape of the inner opening of the through hole 6b when the inner surface 5a of the body portion 5 is seen in a direction orthogonal thereto can be changed from a generally elliptic shape EL1 (see FIG. 4) to a generally elliptic shape EL2 (see FIG. 4) which is closer to a circular shape. By the "direction orthogonal to the inner surface 5a of the body portion 5" is meant a direction perpendicular to the imaginary surface P1 or a direction passing through the point of intersection between the imaginary surface P1 and the inclined axis J1, more specifically, a direction of arrow Y1 in FIG. 2.

The generally elliptic shapes EL1 and EL2 are defined as follows.

The conventional generally elliptic shape EL1 is an opening shape of the through hole 6b in the pressure vessel formed with round portions of an equal radius (i.e., equal in all of R3, R4 and R5 in FIG. 2) throughout the whole circumference of the inner opening of the through hole 6b, and is illustrated to contrast with the elliptic shape EL2 provided according to the invention. More specifically, the generally elliptic shape EL1 appears by projecting middle points of the round portions on a vertical plane. In the example shown in FIG. 2, the generally elliptic shape EL1 is defined by projecting on a vertical plane a middle point D4 of a round portion with radius R4, a middle point D5 of a round portion with radius R5 and middle points D3 of round portions with radius R3. The "vertical plane" indicates a plane parallel to the imaginary surface Pl. The generally elliptic shape EL1 has a minor-radius dimension a1 (see FIG. 4) which is a value half of the distance between the middle points D3 projected on the vertical plane and a major-radius dimension b1 (see FIG. 4) which is a value half of the distance between the middle points D4 and D5 projected on the vertical plane.

The generally elliptic shape EL2 is an opening shape of the through hole 6b in the pressure vessel 1 having round portions wherein the radii R1 and R2 are each smaller than each of radii R3, R3, the round portions increasing in radius continuously from the radii R1 and R2 to the radii R3, R3. More specifically, like the generally elliptic shape EL1, the generally elliptic shape EL2 appears by projecting middle points of round portions on a vertical plane. In the example of FIG. 2, the generally elliptic shape EL2 is defined by projecting a middle point D1 of the round portion with radius R1, a middle point D2 of the round portion with radius R2 and middle points D3 of the round portions with radius R3 on a vertical plane. The "vertical plane" is the same plane as described previously. The generally elliptic shape EL2 has a minor-radius dimension a2 (see FIG. 4) which is a value half of the distance between the middle points D3 projected on the vertical plane and a major-radius dimension b2 (see FIG. 4) which is a value half of the distance between the middle points D1 and D2 projected on the vertical plane. In this embodiment, since the radii R3, R3 are set equal in both generally elliptic shapes EL1 and EL2, the minor-radius dimensions a1 and a2 in generally elliptic shapes EL1 and EL2 are the same. However, no limitation is made thereto. For example, the minor radius of the generally elliptic shape EL2 may be set larger than that of the generally elliptic shape ELL whereby the minor-radius dimension a2 is made longer than the minor-radius dimensional and hence the generally elliptic shape EL2 can be made closer to a circular shape.

Figure 3:
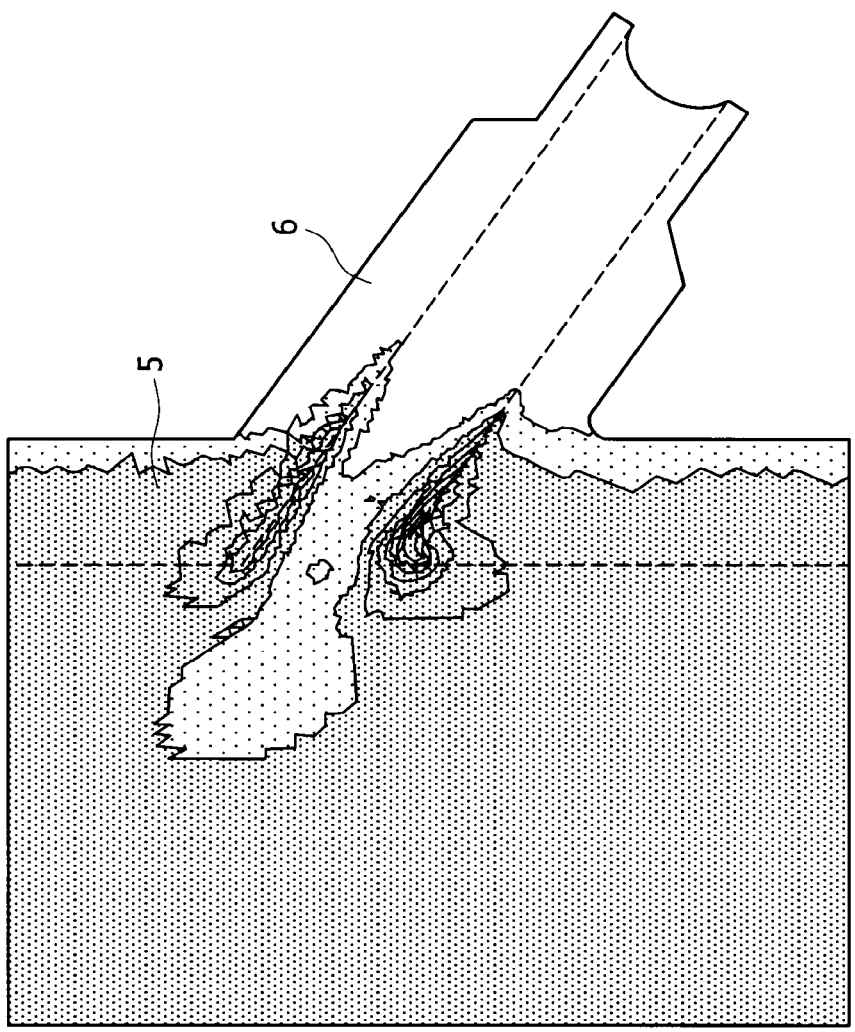
FIG. 3 is a diagram showing the state of stress concentration at II 1 portion in FIG. 1.

In the pressure vessel 1 of this embodiment, as shown in FIG. 3, a highest peak stress is developed at a vertex position C1 (a darkest solid portion in FIG. 3, the reference mark is shown in FIG. 2) of the round portion formed at an acutely intersecting portion between the inner surface 5a of the body portion 5 and the surface 6a which surrounds the through hole 6b, out of the round portions formed at two positions in the major axis direction. The vertex position C1 is somewhat more distant from the inner surface 5a of the body portion 5 than the middle point D1 of a round portion.

In the pressure vessel 1 of this embodiment, as described above, the generally elliptic shape (the shape of the inner opening of the through hole 6b) for evaluation of a peak stress can be changed from the generally elliptic shape EL1 to the generally elliptic shape EL2 which is closer to a circular shape. Therefore, according to the pressure vessel 1 it is possible, for the following reason, to diminish the peak stress without causing a great increase of cost.

It is generally known that when a force (tensile force) is exerted on a flat plate formed with an elliptic hole, the force acting along the surface of the flat plate, a stress induced on the flat plate concentrates on two positions in the major axis direction of the elliptic shape. In this connection, if the shape of the hole is made closer to a circular shape from the elliptic shape, the stress induced on the flat plate is dispersed also in the minor axis direction of the elliptic shape, so that the peak stress becomes smaller. In the pressure vessel 1 described above, by adjusting the radii of round portions, the shape of the inner opening of the through hole 6b can be changed from the generally elliptic shape EL1 to the generally elliptic shape EL2 which is closer to a circular shape, so that the stress concentrated on the portions in the major axis direction (the round portions of radii R1 and R2) can be dispersed in the minor axis direction.

A description will be given below about the results of test making comparison between Examples and Comparative Examples in connection with the pressure vessel 1.

In this test there were provided samples having 45° and samples having 60° in terms of an inclination angle θ (see FIG. 2) of the inclined axis J1 relative to the inner surface 5a of the body portion 5.

As samples having 45° of the inclination angle θ there were provided Comparative Examples 1, 2 and Examples 1, 2. The sample of Comparative Example 1 has 40 mm of radii R1, R2 of round portions in the major axis direction and 20 mm of radii R3, R3 of round portions in the minor axis direction. In Comparative Example 1, round portions decrease in radius continuously from radii R1, R2 to radii R3, R3. The sample of Comparative Example 2 has a round portion whose radius is set to 40 mm throughout the whole circumference. The sample of Example 1 has 20 mm of radii R1, R2 of round portions in the major axis direction and 40 mm of radii R3, R3 of round portions in the minor axis direction. The sample of Example 2 has 10 mm of radii R1, R2 of round portions in the major axis direction and 50 mm of radii R3, R3 of round portions in the minor axis direction. In Examples 1 and 2, round portions increase in radius continuously from radii R1, R2 to radii R3, R3.

Table 1 shows the results of having determined peak stresses by FEM analysis with respect to the samples. A comparison among the samples shows that the magnitude of peak stress becomes smaller in the order of Comparative Example 1, Comparative Example 2, Example 1, and Example 2. It is seen that the difference (21.5 MPa) in peak stress between Comparative Example 2 and Example 1 is much larger than the difference (10.5 MPa) in peak stress between Comparative Examples 1 and 2. Further, a comparison between Examples 1 and 2 shows that the larger the difference between the round portions' radii R3, R3 in the minor axis direction and the round portions' radii R1, R2 in the major axis direction, the lower can be the peak stress.

TABLE 1

| Angle (θ) | Sample | R1 (mm) | R2 (mm) | R3 (mm) | Peak Stress (MPa) | R1/R3 | b/a |
|---|---|---|---|---|---|---|---|
| 45° | Comparative Example 1 | 40 | 40 | 20 | 824.1 | 2.00 | 1.68 |
| | Comparative Example 2 | 40 | 40 | 40 | 813.6 | 1.00 | 1.58 |
| | Example 1 | 20 | 20 | 40 | 792.1 | 0.50 | 1.41 |
| | Example 2 | 10 | 10 | 50 | 760.2 | 0.20 | 1.30 |
| 60° | Comparative Example 3 | 40 | 40 | 20 | 663.5 | 2.00 | 1.68 |
| | Comparative Example 4 | 40 | 40 | 40 | 644.8 | 1.00 | 1.58 |
| | Example 3 | 20 | 20 | 40 | 614.8 | 0.50 | 1.41 |
| | Example 4 | 10 | 10 | 50 | 586.1 | 0.20 | 1.30 |

As samples having 60° of the inclination angle θ there were provided Comparative Examples 3, 4 and Example 3, 4. The sample of Comparative Example 3 has 40 mm of radii R1 and R2 of round portions in the major axis direction and 20 mm of radii R3, R3 of round portions in the minor axis direction. In Comparative Example 3, round portions decrease in radius continuously from radii R1, R2 to radii R3, R3. The sample of Comparative Example 4 has a round portion whose radius is set to 40 mm throughout the whole circumference. The sample of Example 3 has 20 mm of radii R1, R2 of round portions in the major axis direction and 40 mm of radii R3, R3 of round portions in the minor axis direction. The sample of Example 4 has 10 mm of radii R1, R2 of round portions in the major axis direction and 50 mm of radii R3, R3 of round portions in the minor axis direction. In Examples 3 and 4, round portions increase in radius continuously from radii R1, R2 to radii R3, R3.

Table 1 shows the results of having determined peak stresses by FEM analysis with respect to these samples. A comparison among the samples shows that the magnitude of peak stress becomes smaller in the order of Comparative Example 3, Comparative Example 4, Example 3, and Example 4. It is seen that the difference (30.0 MPa) in peak stress between Comparative Example 4 and Example 3 is much larger than the difference (18.7 MPa) in peak stress between Comparative Examples 3 and 4. Further, a comparison between Examples 3 and 4 shows that the larger the difference between the round portions' radii R3, R3 in the minor axis direction and the round portions' radii R1, R2 in the major axis direction, the lower can be the peak stress.

From the above comparisons, it is seen that according as the ratio (R1/R3 or R2/R3, described as R1/R3 in Table 1) obtained by dividing the round portion's radius R1 or R2 in the major axis direction by the round portion's radius R3 in the minor axis direction becomes smaller than 1, the peak stress becomes smaller, as shown in Table 1 and FIG. 5.

Although in the above embodiment a description has been made about the pressure vessel 1 formed with round portions throughout the whole circumference of the inner opening of the through hole 6b, it is preferable that the round portions' radii R1 and R2 in the major axis direction be made as close to zero as possible in order to make the generally elliptic shape EL2 closer to a circular shape to diminish peak stress. However, for suppressing the worker's injury caused by contact with the intersecting portion between the inner surface 5a of the body portion 5 and the surface 6a which surrounds the through hole 6b, it is necessary to form a round portion having a radius of at least, for example, about 3 mm. As to the portion where the inner surface 5a of the body portion 5 and the surface 6a which surrounds the through hole 6b intersect each other at an acute angle, a large curved surface can be obtained even at a small radius and therefore the round portion's radius R1 in the major axis direction can be made smaller than the round portion's radius R2 in the same direction. By thus setting the radius R1 smaller than the radius R2 it is possible to diminish the peak stress while ensuring safety.

Although in the above embodiment reference has been made to the nozzle provided in the shell portion 2 of the pressure vessel 1, the reduction of peak stress can be effected also for a nozzle provided in the first end portion 3. On this regard, a concrete construction will be described below.

Referring to FIG. 1, the first end portion 3 includes a body portion (a part of the vessel body) 7 which is fixed to the body portion 5 so as to close an upper opening of the body portion 5, further includes a nozzle 8 and an inclined nozzle 9 both projecting from the body portion 7. The body portion 7 has a half-split shape of a hollow sphere and has a semispherical inner surface 7a. The nozzle 8 projects upwards from the body portion 7 along an axis perpendicular to the inner surface 7a of the body portion 7. The inclined nozzle 9 projects upwards from the body portion 7 along an inclined axis J2 which is inclined relative to the inner surface 7a of the body portion 7. More specifically, the inclined axis J2 is inclined relative to an imaginary surface which is in point contact with the inner surface 7a of the body portion 7, and the inclined axis J2 passes through the point of contact between the imaginary surface and the inner surface 7a. A through hole of a circular section is formed through both the body portion 7 and the inclined nozzle 9 along the inclined axis J2.

At an intersecting portion between the inner surface 7a of the body portion 7 and a surface 9a which surrounds the through hole there are formed round portions throughout the whole circumference. More specifically, in an inner opening of the through hole which appears as a generally elliptic shape when the inner surface 7a of the body portion 7 is seen in a direction orthogonal thereto, the radius of each of round portions formed at two positions in the major axis direction is smaller than the radius of each of round portions formed at two positions in the minor axis direction. Further, the round portions increase in radius continuously from the round portions' radii in the major axis direction to the round portions' radii in the minor axis direction.

By setting the round portions' radii as above it is possible to diminish the peak stress without requiring a great increase of cost also with respect to the inclined nozzle 9.

The second end portion 4 includes a body portion (a part of the vessel body) 10 which is fixed to the body portion 5 so as to close a lower opening of the body portion 5, and further includes nozzles 11 and 12 projecting from the body portion 10. The body portion 10 has a half-split shape of a hollow sphere and has a semispherical inner surface 10a. The nozzles 11 and 12 project downwards from the body portion 10 along an axis perpendicular to the inner surface 10a of the body portion 10.

What is claimed is:

1. A pressure vessel comprising:
a vessel body having an inner surface; and
an inclined nozzle projecting from a portion of said vessel body and extending from said vessel body along an axis inclined relative to a line orthogonal to the inner surface of said vessel body at said portion of said vessel body, wherein:
a through hole of a circular section is formed through both said vessel body and said inclined nozzle and is centered on said inclined axis;
an intersection of said inner surface of said vessel body and a surrounding surface of said through hole comprises a rounded portion throughout the whole circumference of the through hole;
an inner opening of said through hole appears as a generally elliptic shape when said inner surface of said vessel body is seen in a direction orthogonal to said inner surface at said portion of said vessel body,
the radius of the rounded portion at each of two positions corresponding to the major axes of said generally elliptic shape is smaller than the radius of the rounded portion at each of two positions corresponding to the minor axes of said generally elliptic shape, and
the radius of the rounded portion continuously increases from each of two positions corresponding to the major axes of said generally elliptic shape to the two positions corresponding to the minor axes of said generally elliptic shape.

2. The pressure vessel according to claim 1, wherein the radius of the rounded portion progressively increases in proportion to an angular displacement from a respective one of said major axes of said generally elliptic shape.

3. The pressure vessel according to claim 1, wherein said inclined axis forms an acute angle with the inner surface of said vessel body at a location corresponding to one of said major axes of said generally elliptic shape, and wherein the radius of the rounded portion at said one of the major axes is smaller than the radius of the rounded portion at the other of the major axes.

* * * * *